G. W. SHEPHERD.
Corn-Planters.
No. 165,765.      Patented July 20, 1875.
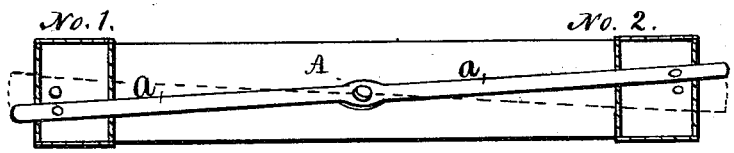
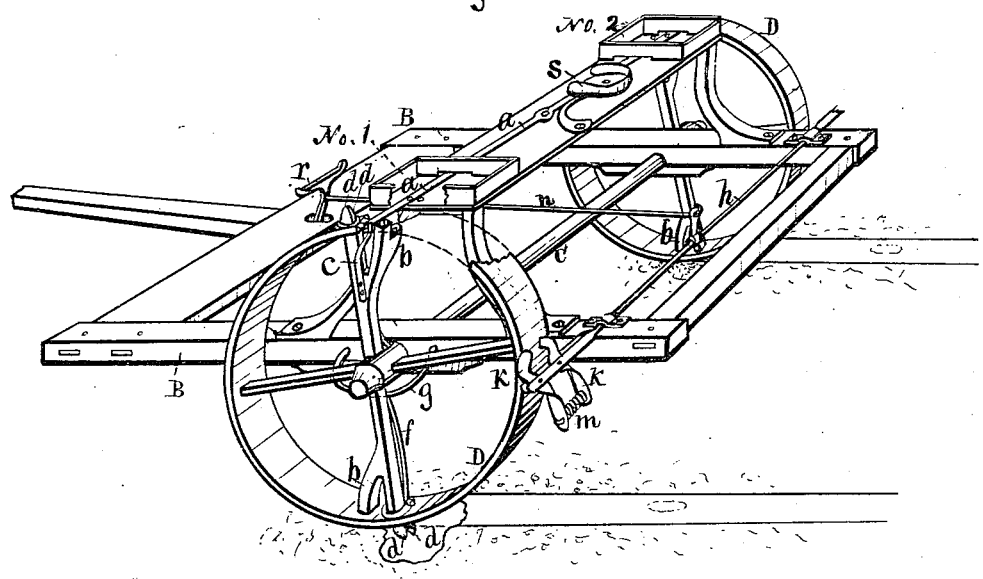

UNITED STATES PATENT OFFICE.

GEORGE W. SHEPHERD, OF AFTON, IOWA.

IMPROVEMENT IN CORN-PLANTERS.

Specification forming part of Letters Patent No. 165,765, dated July 20, 1875; application filed January 2, 1875.

*To all whom it may concern:*

Be it known that I, GEORGE W. SHEPHERD, of Afton, in the county of Union and State of Iowa, have invented an Improved Corn-Planter, of which the following is a specification:

My invention is a planting-machine designed to plant two parallel rows simultaneously by automatically dropping the seeds through the wheels and depositing them in the ground at regular intervals, and at equidistant spaces apart. It consists, first, in a pivoted bar to form and operate the valves in the seed-boxes; second, in a cup and hollow spoke to receive and deposit seed; third, in a valve projecting from the periphery of the wheel; fourth, in a wheel and valve-cleaning device, all as hereinafter fully set forth.

Figure 1 of my drawing is a top view, illustrating the construction and operation of my seed-box valves.

A represents a bench mounted upon a carriage in any suitable manner. Nos. 1 and 2 are seed-boxes, each one having a perforated bottom. $a\,a$ is a horizontal bar pivoted to the bench A at its center. The bar has cups or perforations near its ends that will register with the perforations or valves in the bottoms of the seed-boxes whenever the bar is in line with the centers of the seed-boxes and at right angles with the line of the rows being planted, or the line traveled by the machine.

The manner of forming the perforations or valves in the bar $a\,a$, and also in the seed-boxes, may vary; and they may also vary in size and number to be adapted for various kinds of seeds.

Fig. 2 is a perspective view of the complete machine, and illustrates its construction and operation.

B B represent a carriage-frame, which may be made of wood and joined together in any suitable way. C is a revolving carriage axle, which has its bearings in the sides of the frame B B. D D are carriage-wheels rigidly attached to the ends of the axle C. $b\,b$ are branches on the spokes of the wheels D. They are hollow, and have mouths and lips extending toward the seed-boxes to receive the seed as it drops from conductors connected with the seed-box valves. The outer ends of the spokes are also hollow, and U-shaped tubes and conductors are formed by the hollow spokes and their branches $b$. $c\,c$ are elastic fingers fixed in the forks of one of the spokes of each wheel in such a manner that they will alternately come into contact with the pivoted bar $a\,a$, and move the ends of the bar alternately back and forth. $d\,d$ are lips of conoidal form outside of the rim of the wheel. One of them is fixed rigidly to the rim. The other has a lever-handle, $f$, extending into a groove in the hub of the wheel, and is hinged to the rim of the wheel in such a manner that a movement of the handle will cause it to open and close upon the fixed or stationary lip. $g$ is a bent rod fixed in the carriage-frame in such a manner that it will encircle the lower half of the hub of the wheel and act like a cam to engage the levers $f$ and open the lips or valves $d$ whenever they enter the ground. $h$ is a rock-shaft that has its bearings on the sides of the carriage-frame and in rear of the wheels. $k\,k$ are scrapers of suitable form pivoted to the ends of the rock-shaft $h$. $m$ is a coil-spring that keeps the upper ends of the scrapers closed together, and allows them to part when the projecting valve $d\,d$ passes through the scrapers $k\,k$. $n$ is a rod connecting the shaft $h$ and the lever $r$, pivoted in front of the driver's seat $s$, in such a manner that the driver can operate the scrapers $k$ by pressing his foot on the lever $r$.

A suitable brake may be attached, so that the driver can, by hand or foot, operate a lever and lock the wheels, and to bring the wheels and their projecting valves $d\,d$ into proper position to start planting at any point desired, or to recover and correct any deviation interfering with the cross-rows, and which may occur by the slipping or sticking of the wheels.

In the practical operation of my planter the fingers $c$, on opposite positions on the wheels D, move the bar $a\,a$ alternately and operate the valves in the seed-boxes Nos. 1 and 2. Conductors direct the seeds into the U-shaped tubes of the forked spokes. As the wheels revolve forward the U-shaped tube becomes inverted, and the seed passes from the spoke and into the valves $d\,d$; and when the projecting valves $d$ $d$ enter the ground the cams $g$ engage the lever-handles $f$ and open the valves, and the seed is thereby deposited in the ground.

A complete automatic mechanism is thus provided to take the seed from the boxes and deposit it in the ground, and to plant two rows simultaneously and in equidistant spaces without previously marking the ground.

I am aware that a pivoted bar has been combined with seed-boxes and actuated by a cam on one of the wheels to operate the seed-valves; but I claim that my bar $a$ $a$, pivoted at its center to move its ends back and forth and open and close the valves of the two seed-boxes simultaneously by the alternate action of the fingers $c$ $c$ on the opposite wheels, is new and greatly advantageous.

I am aware that hollow spokes have been used to convey seeds; but I claim that my branch $b$, forming a U-shaped conductor adapted to receive seed when at the top of the wheel and to discharge the same at the bottom of the wheel, is new and advantageous.

I am aware that projections on the wheels have been used for burying seeds; but I claim that my projecting valve, designed to open while in the ground, as combined with my U-shaped conductors, is new and advantageous.

I claim as my invention—

1. In a seed-planter, the combination of the pivoted bar $a$ $a$, having seed-cups in its ends, the seed-boxes Nos. 1 and 2, and the carriage-wheels D D, having fingers $c$ $c$ in diverse positions, substantially as and for the purposes shown and described.

2. The branch tube $b$ on the hollow spoke of the seed-wheel, to form a cup and U-shaped seed carrier and conductor, substantially as shown and described.

3. The valves $d$ $d$ $f$ $g$, in combination with the spoke-branch $b$ and U-shaped conveyers, substantially as and for the purposes shown and described.

4. The scrapers $k$ $k$ $m$, conforming in shape with the projecting valves $d$ $d$, and pivoted to the rock-shaft $h$, as and for the purposes shown and described.

5. The bench A, carrying the seed-boxes Nos. 1 and 2 and the pivoted bar $a$ $a$, the carriage-frame B B, carrying the cams $g$ $g$, the wheels D D, carrying the fingers $c$ $c$, and branch spokes $b$ $b$, forming U-shaped conveyers, and the valves $d$ $d$ $f$ $g$, arranged and combined substantially as and for the purposes shown and described.

GEORGE W. SHEPHERD.

Witnesses:
IRA C. BURKHEIMER,
E. S. KETCHUM.